April 28, 1964    B. SCHLOSSER ETAL    3,130,763
DRILLS FOR CUTTING WOODEN PLUGS WITH CROSS GRAIN
Filed Sept. 13, 1962
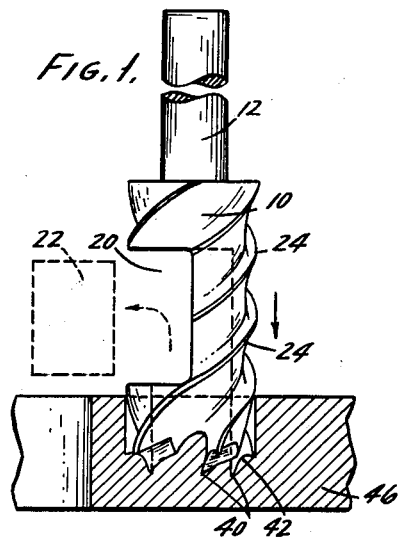
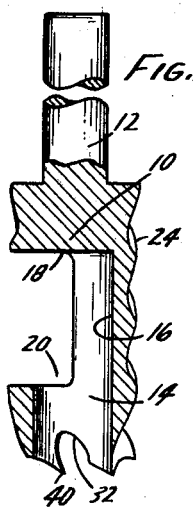
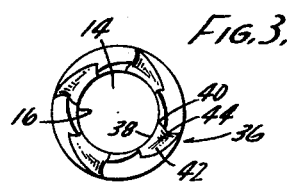
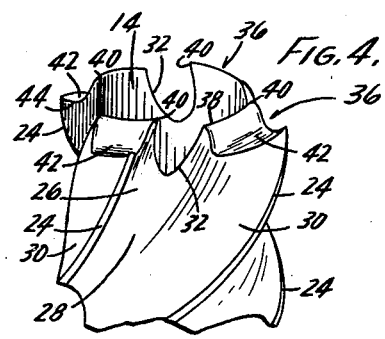
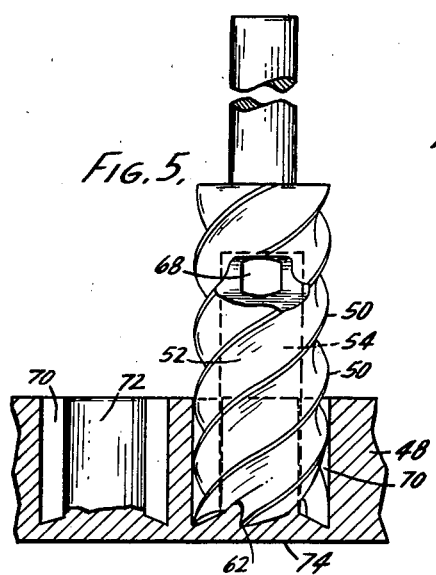
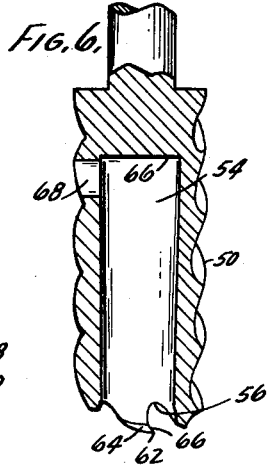
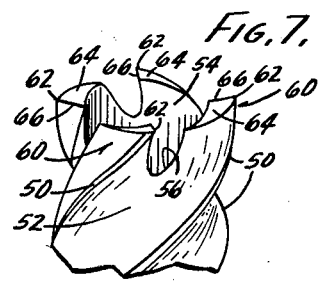
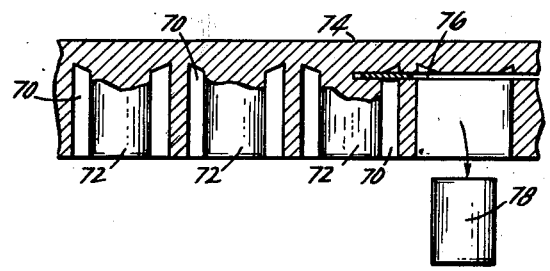
INVENTOR.
BERNARD SCHLOSSER
ROBERT R. GUTHRIDGE
Wheeler, Wheeler & Wheeler
ATTORNEYS.

United States Patent Office 3,130,763
Patented Apr. 28, 1964

3,130,763
DRILLS FOR CUTTING WOODEN PLUGS WITH CROSS GRAIN
Bernard Schlosser, 211 McKeon Road, Kenosha, Wis., and Robert R. Guthridge, 93 Harvey Ave., Grayslake, Ill.
Filed Sept. 13, 1962, Ser. No. 223,410
4 Claims. (Cl. 145—120)

This invention relates to plug cutting drills.

The drills of the present invention are used in cutting wooden plugs with cross grain. Such plugs are required in cabinet work and in the making of furniture, bowling alleys, and floors and elsewhere to cover in inconspicuous manner holes made in the work for construction purposes. For example, a hole may be bored to receive the head of a screw and the inserted plug has its cross grain aligned with the grain of the work so that, when the composite surface is finished, the point where the construction opening was formed is practically invisible.

Two different embodiments of the invention are illustrated. In the embodiment shown in FIGS. 1 to 4, a tubular drill has a lateral opening sufficiently large to discharge centrifugally successive plugs raised to the level of the opening under pressure of chips and shavings or plugs subsequently cut.

The embodiment shown in FIGS. 5 to 8 also has a lateral opening from the interior of the tubular drill but in this instance it is solely for the discharge of shavings and chips, the use of the drill being such that it makes blind annular holes but does not cut completely through the work. When a number of annular holes have been drilled in the work to substantially uniform depth close to the remote face thereof, a saw is used to sever the remote face portion of the work, thus freeing the plugs at the centers of the annular holes.

In both constructions, the exterior of the annular drill is in the nature of a twist drill having helical lands and intervening helical channels. At the working end of the drill, the channels are progressively deepened until they communicate with the interior of the drill to provide notches segregating teeth formed at the ends of the respective lands. Each such tooth is generally triangular in plan having a concave cylindrical inner wall and a generally radial chisel edge at the forward or leading end of the tooth. Due to the fact that the lands are asymmetrical, having an abrupt drop into the intervening channel at their leading sides and having a gradual taper in the channel at the trailing sides of each land, the outside surface of each tooth has a progressively decreasing radius from the leading end of the tooth to the point where it runs out into the notch at the trailing end of the tooth. The end surface of the tooth also has axial relief away from its leading or cutting edge.

In the embodiment shown in FIGS. 1 to 4, the tooth has an arcuate rim constituting an axial extension of its cylindrical inner surface. The cutting edge of the tooth extends axially up the rim. The resulting corner is sharp and thin and cuts a narrow ribbon of wood. It is capable of penetrating the bottom face of a workpiece without splintering the workpiece or impairing the margain of the end surface of the cut plug.

In the drawings:

FIG. 1 is a view in side elevation of a drill embodying the invention, the drill being illustrated for use in a piece of work shown fragmentarily in cross section.

FIG. 2 is a view in axial section through the drill shown in FIG. 1, the shank being fragmentarily illustrated in elevation.

FIG. 3 is a view in plan of the cutting end of the drill shown in FIG. 2.

FIG. 4 is an enlarged fragmentary detail view through the cutting end of the drill as it appears in perspective.

FIG. 5 is a side elevational view of a modified embodiment of the drill as it appears when operating in a piece of work fragmentarily illustrated in section.

FIG. 6 is a view in axial section through the drill of FIG. 5, the shank being fragmentarily illustrated in elevation.

FIG. 7 is an enlarged fragmentary detail view in perspective showing the cutting end of the embodiment of FIGS. 5 and 6.

FIG. 8 is a diagrammatic view in section showing the manner in which plugs cut with the drill of FIGS. 5 to 7 are separated from the workpiece, the workpiece and portions of some of the plugs being shown in section.

The drill shown in FIGS. 1 to 4 comprises a tubular body portion 10 and a shank 12 projecting from a closed end of the body portion. Within the body portion is a bore at 14 extending from the cutting head presently to be described toward the closed end of the body portion and proferably having progressively increased radius at 16 as it approaches the closed end 18. Opening laterally through the body portion 10 is an ejection port 20 through which finished workpieces are discharged centrifugally in the manner indicated at 22 in dotted lines in FIG. 1. The centrifugal ejection normally occurs during the period when the tool is being retracted from the work.

Formed on the outside of the body 10 and interrupted by the opening 20 are the lands 24. These are asymmetrical in cross section, having abrupt slopes 26 into the intervening channel or flute 28 at the side of the land which is advanced in the direction of rotation. The tool shown is designed to rotate clockwise as viewed in plan and counterclockwise as viewed in the inverted position in which it is illustrated in FIG. 4. The trailing surface 30 of each of the lands 24 has a gentle slope into the flute 28 behind the land as compared with the abrupt slope 26 into the flute ahead of the land.

The channels or flutes 28 between the lands have progressively increasing depth toward the cutting end of the tool. They communicate with the interior bore 14 at the respective notches 32 between the cutting teeth 36. Each tooth is formed with a rim portion 38 which is concentric with the axis of the tool adjoining the bore 14 and has a rake rearwardly from its leading margin 40. The leading apex 40 of each tooth is approximately at the point where the corresponding land 24 would terminate if extended to the end of the tool. Actually, each tooth has a shelf portion 42 radially outside of this rim and having a forward cutting margin 44 from which the shelf extends rearwardly. The land terminates in line with the cutting margin 44 of the shelf portion, the said cutting margain extending outwardly on the rim 38 to the apex 40, as shown in FIGS. 3 and 4.

Externally, the several lands are finished to conform to a common cylindrical surface.

The tool shown in FIGS. 1 to 4 will cut across the grain completely through a workpiece such as that shown at 46 to completely sever the plug 12 therefrom without splintering either the plug or the workpiece 46. Due to the slight progressive enlargement in radius of the upper portion 16 of bore 14, the successive plugs move upwardly without binding in the bore and when the lateral opening 20 clears the bore the plug will be ejected centrifugally.

In the construction shown in FIGS. 5 to 7, it is not intended that the drill pass completely through the workpiece 48. The lands 50 are asymmetrical in cross section, exactly as above described and are finished to a common cylindrical surface. The flutes 52 between the lands open into the central bore 54 to form notches 56 between the several teeth generically designated by reference character 60. The point of maximum axial projection of each tooth is the point 62 at which the land intersects the beveled face 64 of the respective tooth, the face 64 being inclined inwardly toward the bore and rearwardly from the cutting edge 66. As in the construction first described, each tooth is generally triangular in end elevation having a concavely curved margin at the bore 54 and a convexly curved outer margin along the rear face of the respective land.

As best shown in FIG. 6, the internal bore 54 has progressively increasing radius toward its closed end at 66. Near that end, there is a lateral port opening at 68 for the discharge of shavings.

The use of this tool forms an annular channel 70 around a post 72 which remains fixed in the workpiece 48 as shown at the left in FIG. 5. The annular channel 70 is blind, since it does not open to the continuous face 74 of the workpiece. When a number of such channels have been made, as shown in FIG. 8, a saw 76 is used to sever the closed face 74 from the portion of the workpiece in which the channels 70 have been cut. This severs the several posts 72, which are thereupon discharged as finished plugs 78.

We claim:

1. As a new article of manufacture, a plug cutting drill comprising a generally tubular body having a hollow interior and a side wall provided with a lateral opening communicating with the interior, said side wall being provided externally with helical lands and intervening flutes, the flutes intersecting the hollow interior of the body at notches between lands at one end of the body, said one end having a plurality of teeth, each tooth having a cutting margin at one such notch and being of generally triangular form as viewed from the end of the drill, each such land being asymmetrical in cross section with an abrupt drop into the flute which forms the notch ahead of it and a more gradual drop into the flute at the rear of it, each tooth having relief rearwardly and axially from its said cutting margin and radially from the juncture of its cutting margin with the interior of the drill.

2. A drill according to claim 1 in which the hollow interior of the drill is generally circular in cross section and has a progressively increasing radius away from the teeth.

3. A drill according to claim 1 in which the hollow interior of the drill is closed at a point remote from the teeth and the said opening is located immediately adjacent the point at which the hollow interior is closed.

4. A drill according to claim 1 in which the opening is sufficiently large for the ejection of an entire plug cut by the drill, each said tooth having adjacent the hollow interior of the drill an axially projecting arcuate rim whereof the forward margin constitutes a part of said cutting edge.

References Cited in the file of this patent
UNITED STATES PATENTS

| | | |
|---|---|---|
| 2,840,348 | Tilden | June 24, 1958 |
| 2,858,109 | Tengberg | Oct. 28, 1958 |
| 2,978,002 | Ransom | Apr. 4, 1961 |